(12) United States Patent
Saito et al.

(10) Patent No.: US 9,455,456 B2
(45) Date of Patent: Sep. 27, 2016

(54) SOLID OXIDE FUEL CELL POWER PLANT WITH AN ANODE RECYCLE LOOP TURBOCHARGER

(71) Applicant: Ballard Power Systems Inc., Burnaby (CA)

(72) Inventors: Kazuo Saito, Glastonbury, CT (US); Tommy Skiba, East Hartford, CT (US); Kirtikumar H. Patel, Berlin, CT (US)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 14/754,642

(22) Filed: Jun. 29, 2015

(65) Prior Publication Data
US 2015/0303499 A1   Oct. 22, 2015

Related U.S. Application Data

(62) Division of application No. 13/567,162, filed on Aug. 6, 2012, now Pat. No. 9,083,016.

(51) Int. Cl.
| | |
|---|---|
| *H01M 8/04111* | (2016.01) |
| *H01M 8/04* | (2016.01) |
| *H01M 8/06* | (2016.01) |
| *H01M 8/12* | (2016.01) |

(52) U.S. Cl.
CPC ..... *H01M 8/04111* (2013.01); *H01M 8/04089* (2013.01); *H01M 8/04097* (2013.01); *H01M 8/04425* (2013.01); *H01M 8/04708* (2013.01); *H01M 8/0662* (2013.01); *H01M 8/12* (2013.01); *H01M 2008/1293* (2013.01); *H01M 2300/0074* (2013.01); *Y02E 60/50* (2013.01); *Y02E 60/525* (2013.01)

(58) Field of Classification Search
CPC .................................................. H01M 8/04111
See application file for complete search history.

(56) References Cited

U.S. PATENT DOCUMENTS

| 4,041,210 A | * | 8/1977 | Van Dine | 429/415 |
|---|---|---|---|---|
| 6,607,854 B1 | * | 8/2003 | Rehg et al. | 429/413 |

(Continued)

FOREIGN PATENT DOCUMENTS

| JP | 2001-351665 | * | 12/2001 |
|---|---|---|---|
| JP | 2001-351665 A | | 12/2001 |

OTHER PUBLICATIONS

JP 2001-351665 MT.*

*Primary Examiner* — Patrick Ryan
*Assistant Examiner* — Alex Usyatinsky
(74) *Attorney, Agent, or Firm* — Seed IP Law Group PLLC

(57) ABSTRACT

An anode exhaust recycle turbocharger (100) has a turbocharger turbine (102) secured in fluid communication with a compressed oxidant stream within an oxidant inlet line (218) downstream from a compressed oxidant supply (104), and the anode exhaust recycle turbocharger (100) also includes a turbocharger compressor (106) mechanically linked to the turbocharger turbine (102) and secured in fluid communication with a flow of anode exhaust passing through an anode exhaust recycle loop (238) of the solid oxide fuel cell power plant (200). All or a portion of compressed oxidant within an oxidant inlet line (218) drives the turbocharger turbine (102) to thereby compress the anode exhaust stream in the recycle loop (238). A high-temperature, automotive-type turbocharger (100) replaces a recycle loop blower-compressor (52).

18 Claims, 6 Drawing Sheets

(56) References Cited

U.S. PATENT DOCUMENTS

| | | | |
|---|---|---|---|
| 2004/0121207 A1* | 6/2004 | Bunker et al. | 429/30 |
| 2004/0150366 A1* | 8/2004 | Ferrall et al. | 320/101 |
| 2005/0196659 A1* | 9/2005 | Grieve et al. | 429/34 |
| 2008/0070078 A1* | 3/2008 | Gummalla et al. | 429/26 |
| 2011/0053023 A1* | 3/2011 | Johansen et al. | 429/429 |
| 2012/0040258 A1* | 2/2012 | Konrad et al. | 429/414 |

* cited by examiner

US 9,455,456 B2

SOLID OXIDE FUEL CELL POWER PLANT WITH AN ANODE RECYCLE LOOP TURBOCHARGER

This invention was made with government support under Contract No. DE-NT0003894 awarded by the Department of Energy. The government has certain rights in the invention.

TECHNICAL FIELD

The present disclosure relates to solid oxide fuel cells and in particular relates to a solid oxide fuel cell having an anode exhaust recycle loop including a turbocharger.

BACKGROUND ART

Fuel cells are well known and are commonly used to produce electrical current from reducing fluid fuel and oxygen containing oxidant reactant streams, to power various types of electrical apparatus. Known solid oxide fuel cells ("SOFC") generate both electricity and heat by electrochemically combining a fluid reducing fuel and an oxidant across an ion conducting electrolyte. In a typical SOFC, the electrolyte is an ion conductive ceramic membrane sandwiched between an oxygen electrode (cathode) and a fuel electrode (anode). Molecular oxygen, such as from the atmosphere, reacts with electrons at the cathode electrode to form oxygen ions, which are conducted through the ceramic membrane electrolyte to the anode electrode. The oxygen ions combine with a reducing fuel such as a mixture of hydrogen and carbon monoxide to form water and carbon dioxide while producing heat and releasing electrons to flow from the anode electrode through an electrical circuit to return to the cathode electrode.

Solid oxide fuel cells have many benefits and some limitations. For example, normal operating temperatures are very high, often in excess of 700° C., which favors stationary power plants operating in a near steady-state mode to minimize deleterious effects of thermal cycling as the fuel cell is started up and shut down. Efforts have been undertaken to increase the efficiency of such solid oxide fuel cells. For example, it is known to direct flow of unused fuel as an anode exhaust stream through an anode recycle loop, wherein unused fuel is directed from an anode exhaust line of the fuel cell, typically then through one or more heat exchangers, and back into an anode inlet upstream of the fuel cell.

SUMMARY OF THE INVENTION

Discovery of Problem

Use of an anode recycle loop, however, has given rise to problems specific to the anode recycle loop. It is considered that part of present inventive disclosure is the discovery of problems described below associated with the anode recycle loop in an SOFC power plant. These discoveries are not part of the prior art. A primary problem of SOFC power plant anode recycle loop is that the anode exhaust stream leaving the solid oxide fuel cell is quite hot and typically can be directed through one or more heat exchangers to heat an incoming fuel reactant stream upstream from the fuel cell. When the anode exhaust stream is finally directed back into a fuel inlet line, it is known to still be as hot as about 400 degrees Celsius ("° C."), which is about 750 degrees Fahrenheit.

Known low-pressure blowers utilized in fuel cells and capable of operating at such a high temperature are very expensive, typically quite large, and also utilize oil lubricated bearings to support a blower shaft. The 400° C. recycling anode exhaust passing through such blowers often results in volatilization of some of the oil lubricant, which then flows with the recycled anode exhaust into the anode inlet and ultimately onto an anode catalyst and electrolyte within the fuel cell. This results in very deleterious poisoning of the anode catalyst and electrolyte which diminishes fuel cell performance.

Research by the inventors herein to solve this problem led to exploration of use of high-temperature tolerant automotive turbochargers. While use of turbochargers, or mechanically linked turbines, is well known in fuel cells, no prior art shows use of a turbocharger to force an anode exhaust stream to cycle through an anode exhaust recycle loop. U.S. Pat. No. 4,041,210 that issued on Aug. 9, 1977 to Van Dine (which patent is owned by the assignee of all rights in the present disclosure) shows use of a turbocharger to drive a first turbine with combusted molten carbonate fuel cell oxidant exhaust, while a mechanically linked second turbine or compressor forces the oxidant into the fuel cell. More recently, U.S. Pat. No. 6,607,854 that issued to Rehg et al. on Aug. 19, 2003, utilizes pressure of combusted, unused fuel cell gas to power a first turbine that in turn rotates a second turbine or an oxidant inlet compressor to force oxygen into the fuel cell. Heated exhaust from the first turbine is also used to preheat the oxidant being forced into the fuel cell. Such use of turbochargers in fuel cells, however, does not show any use of a turbocharger in a SOFC power plant anode recycle loop.

Discovery of Solution

The disclosure includes a solid oxide fuel cell power plant having a turbocharger that has a turbocharger turbine in fluid communication with a compressed oxidant stream within an oxidant inlet line downstream from an oxidant compressor or a compressed oxidant supply, and a turbocharger compressor mechanically linked to the turbocharger turbine and secured in fluid communication with a flow of anode exhaust passing through an anode exhaust recycle loop.

More specifically, the SOFC power plant includes a solid oxide fuel cell having a cathode flow field configured for receiving a flow of an oxidant reactant through a cathode inlet from an oxidant compressor or a compressed oxidant supply, and configured for directing the flow of the oxidant reactant through the cathode flow field in fluid communication with a cathode electrode and an electrolyte. An anode flow field is configured for receiving a flow of a reducing fuel through an anode inlet from a fuel supply, for directing the flow of reducing fuel adjacent an anode electrode and the electrolyte, and is also configured for directing the flow of the reducing fuel out of the fuel cell as an anode exhaust through an anode exhaust line.

The power plant also includes an anode exhaust recycle loop for directing flow of all or a portion of the anode exhaust passing out of the anode flow field within the anode exhaust line through the loop and back into the anode inlet. The turbocharger includes the turbocharger turbine and the turbocharger compressor that are mechanically linked together by the mechanical linkage that may be enclosed within a housing which extends between the turbocharger turbine and the turbocharger compressor.

As recited above, the turbocharger turbine is secured in fluid communication with the flow of oxidant passing downstream from the compressed oxidant supply and the turbocharger compressor is secured in fluid communication with the flow of anode exhaust passing through the anode exhaust recycle loop.

By using the turbocharger within the anode recycle loop, a turbocharger that is commonly utilized within automotive engines may be used. Such automotive turbochargers are abundant in an enormous array of performance characteristics from the intensely competitive automotive racing industry. Moreover, it is known that such automotive turbochargers generally are constructed to tolerate very high temperatures, frequently exceeding 700° C.

In another embodiment of the present SOFC power plant the oxidant inlet line may include a turbocharger bypass line for directing a portion of the compressed oxidant stream downstream from the compressed oxidant supply to bypass the turbocharger turbine of the turbocharger. In certain operating conditions of the SOFC power plant, the rate of flow of the anode exhaust stream through the anode recycle loop and turbocharger compressor of the turbocharger may be less than a rate of flow of the oxidant stream needed to pass into the fuel cell. A bypass line control valve may be utilized to direct a portion of the oxidant stream through the turbocharger bypass line and into the fuel cell.

A further embodiment of the present SOFC power plant utilizes a multi-stage oxidant compressor. A required pressure rise for the oxidant stream within the oxidant inlet line may be lower than a proper pressure to efficiently drive the turbocharger turbine. Use of a multi-stage oxidant compressor will provide a proper pressure rise for a portion of the oxidant stream leaving the compressor to drive the turbocharger turbine and will also provide a proper pressure rise for a portion of the oxidant stream passing through the turbocharger bypass line to supply the fuel cell. Use of the multi-stage compressor will minimize energy loss resulting from over pressuring the cathode air to drive the turbocharger turbine. Alternatively, a pressure booster may be located between the oxidant compressor or compressed oxidant supply and the turbocharger turbine. The pressure booster would be secured downstream from an intersection of the oxidant inlet line and the turbocharger bypass line, so that the compressed oxidant supply provides the oxidant stream at a proper pressure and flow rate for the fuel cell through the turbocharger bypass line, while the pressure booster provides a proper pressure rise of the portion of the oxidant stream passing from the oxidant inlet line into the turbocharger turbine.

In an alternative embodiment, the turbocharger also includes a housing enclosing the mechanical linkage between the turbocharger turbine and compressor. A purge gas line extends from the oxidant inlet line into the housing. The housing is configured so that a pressure within the housing is less than pressures of the reactant streams within the oxidant inlet and anode recycle loop. The purge gas passing through the housing removes out of the housing to safe disposal any fuel or reactant leaking through turbine seals of the turbocharger into the housing. The purge gas also removes any volatilized oil out of the housing so that it cannot contaminate reactant streams within the turbines.

The housing is configured so that the mechanical linkage between the turbocharger turbine and the turbocharger compressor passes within the housing. The mechanical linkage also includes a shaft supported by lubricated bearings within the housing and the shaft passes from the housing into the turbocharger turbine through a turbocharger turbine seal of the housing and the shaft passes from the housing into the turbocharger compressor through a turbocharger compressor seal of the housing.

The purge gas line is preferably secured in fluid communication between the oxidant inlet downstream from the compressed oxidant supply and the housing of the turbocharger for directing a purge gas stream from the oxidant inlet into, through and out of the housing.

In another embodiment, the housing of the turbocharger is configured so that a pressure within the housing is about ambient pressure and the compressed oxidant supply compresses the oxidant within the flow of oxidant flowing through the turbocharger turbine to a pressure above ambient pressure. Also, the turbocharger compressor causes a pressure within the flow of fuel flowing through the turbocharger compressor to similarly be above ambient pressure.

The configuration of the housing may simply be that a purge gas outlet of the housing and the purge gas line are dimensioned so that a rate of flow of the purge gas out of the housing through the purge gas outlet is adequate to prevent any build-up of pressure beyond ambient within the housing. Alternatively, the power plant may include a controller for controlling a pressure within the housing to be below a pressure of the oxidant within the turbocharger turbine and to be below a pressure of the anode exhaust within the turbocharger compressor. Such a controller may include hand actuated or electro-mechanical valves, pressure sensors and communication systems appropriate for adjusting pressures in response to sensed pressures.

Consequently, any leaks of the oxidant flow within the turbocharger turbine through the turbocharger turbine seal or any leaks of fuel flow within the turbocharger compressor through the turbocharger compressor seal would pass from the turbines into the ambient pressure housing to be purged out of the housing by the purge gas stream, so that any leaking reactants cannot accumulate to form an explosive concentration. Additionally, any volatilized lubricants from the bearing supported shaft and any other contaminants from components of the mechanical linkage between the turbocharger turbine and compressor within the housing will also be forced out of the housing by the purge gas stream.

Therefore, use of an automotive-type turbocharger dramatically increases efficiency of operation, and decreases cost of manufacture of the present SOFC power plant. Additionally, because the housing of the turbocharger is positively vented by the purge gas line to remove from the power plant volatilized oil and any other contaminants, maintenance of the power plant will be less costly because power plant catalysts and electrolytes are not poisoned by such contaminants and therefore will have longer operational life spans.

Accordingly, it is a general object to provide a solid oxide fuel cell power plant with an anode recycle turbocharger that overcomes deficiencies of the prior art.

It is a more specific object to provide a solid oxide fuel cell power plant with an anode recycle turbocharger that enhances efficiencies of operation of the power plant and decreases costs of manufacture and maintenance of the power plant.

DESCRIPTION OF THE PREFERRED EMBODIMENTS

Figure 1:
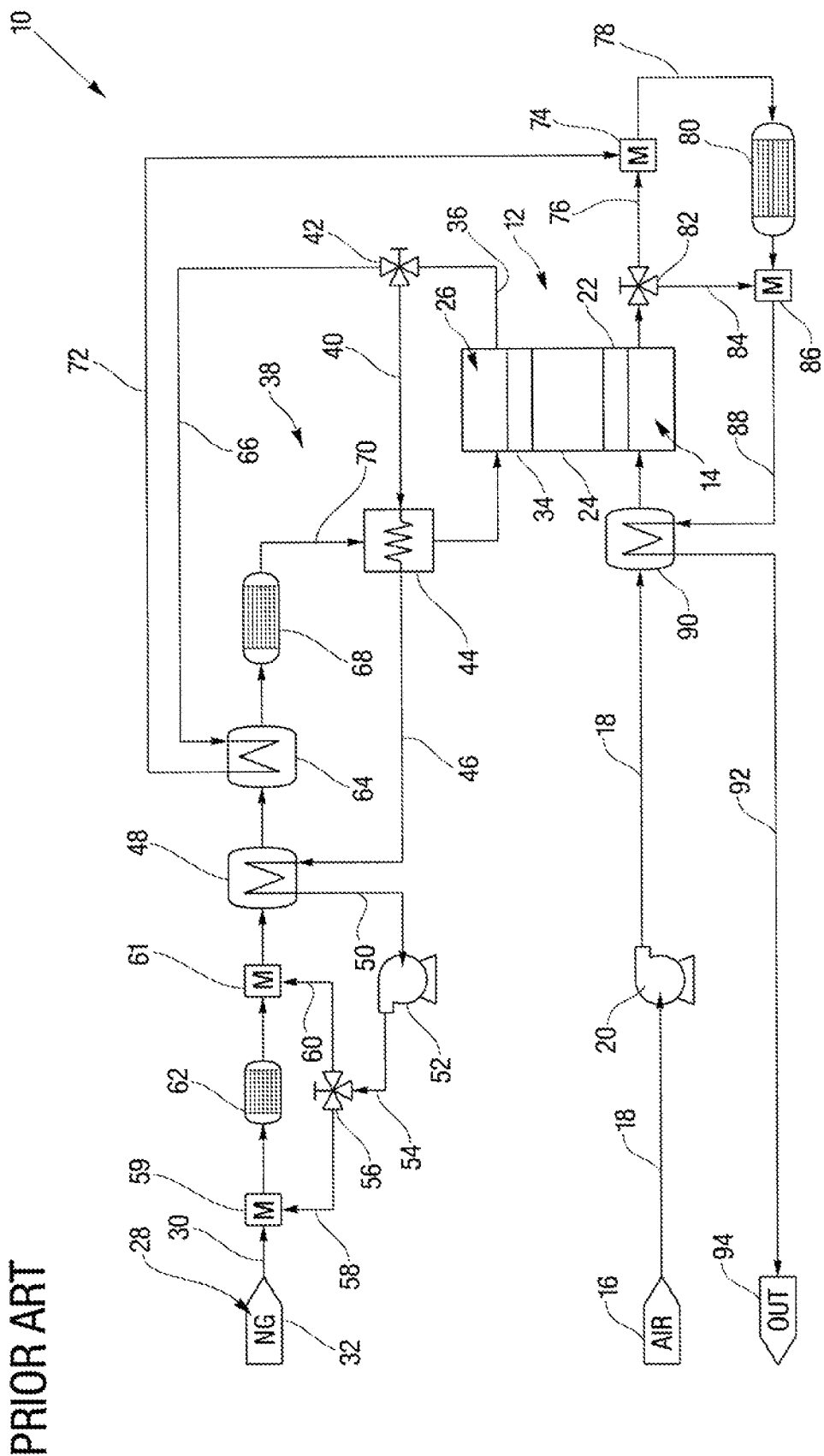
FIG. 1 is a simplified schematic drawing showing a prior art solid oxide fuel cell power plant.

Referring to the drawings in detail, a prior art solid oxide fuel cell power plant is shown in FIG. 1 and is generally designated by reference numeral 10. The power plant 10 includes a solid oxide fuel cell 12 having a cathode flow field 14 configured for receiving a flow of an oxidant reactant from an oxidant source 16, such as atmospheric air, through a cathode inlet line 18. An oxidant compressor 20 or compressed oxidant supply 20 is secured to the cathode inlet line 18 and the compressor 20 is configured for directing the flow of the oxidant reactant through the cathode flow field 14 in fluid communication with a cathode electrode 22 and an electrolyte 24. It is noted that the compressed oxidant supply 20 may be a known compressor 20 common to fuel cells, or may also be any apparatus or device capable of supplying a flow of an oxidant reactant stream at a predetermined pressure, such as a compressed air container with a pressure control valve, etc.

An anode flow field 26 is configured for receiving a flow of a reducing fuel 28 (such as natural gas, designated by "NG" in FIG. 1) through an anode inlet 30 from a fuel supply 32. The anode inlet 30 directs the flow of reducing fuel adjacent an anode electrode 34 and the electrolyte 24. An anode exhaust line 36 directs flow of the reducing fuel 28 out of the anode flow field 26 of the fuel cell 12 as an anode exhaust stream.

An anode exhaust recycle loop 38 directs flow of a portion of or all of the anode exhaust stream from the anode exhaust line 36 back into the anode inlet 30. The anode exhaust recycle loop 38 may include a series of extension lines or pipes of the loop 38. For example and as shown in FIG. 1 a first extension 40 of the loop 38 directs the anode exhaust stream from the anode exhaust line 36 and a first anode exhaust three-way valve 42 on the anode exhaust line 36 to an anode inlet heat exchanger 44. A second extension 46 of the loop 38 directs the anode exhaust stream from the anode inlet heat exchanger 44 to a first reformer heat exchanger 48. A third extension 50 of the loop 38 directs the anode exhaust stream from the first reformer heat exchanger 48 secured to the anode inlet 30 into an anode exhaust recycle loop blower 52. A fourth extension 54 of the loop 38 directs the anode exhaust stream from the blower 52 into a second anode exhaust three-way valve 56 which in turn selectively directs the anode exhaust stream through either a fifth extension 58 of the loop 38 or a sixth extension 60 of the loop 38 to different locations along the anode inlet 30. For example, the fifth extension 58 may be secured to a first anode inlet mixer 59 immediately downstream from the fuel supply 32 as shown in FIG. 1. The sixth extension 60 may be secured to a second anode inlet mixer 61 on the anode inlet 30 downstream from the first mixer 59. It is to be understood that the above-described solid oxide fuel cell power plant 10 of the prior art may include fewer or additional components as is known in the art.

When using natural gas as a fuel for a SOFC power plant it is common to include a component to remove sulfur from the fuel, such as a hydro-desulfurizer 62 secured to the anode inlet 30, optionally between the first and second anode inlet mixers 59, 61 into which the fifth and sixth extensions 58, 60 of the anode recycled loop are secured to the anode inlet 30, as shown in FIG. 1. Having the desulfurizer between the two mixers 59, 61 enables a control system (not shown) to control the second anode exhaust three-way valve 56 to carefully regulate a temperature of the natural gas fuel reactant entering the desulfurizer 62 and proceeding through the anode inlet 30. Additionally, a second reformer heat exchanger 64 may also be secured in thermal exchange relation with the fuel reactant passing through the anode inlet 30. The second reformer heat exchanger 64 receives a heated portion of the anode exhaust stream passing through the anode exhaust line 36 and the first anode three-way valve 42 into a second reformer heat exchanger feed line 66. The second reformer heat exchanger 64 and the first reformer heat exchanger 48 cooperate to provide an appropriate amount of heat to the fuel reactant stream passing through the anode inlet 30 as the fuel enters a fuel reformer, such as a catalytic steam reformer 68.

As is well known in the fuel cell art, such a fuel reformer produces a high concentration of hydrogen gas that is then fed into the anode flow field 26 through an extension 70 of the anode inlet 30. The pure hydrogen gas within the extension 70 may also pass through the anode inlet heat exchanger 44 that is in thermal exchange relation with the anode exhaust stream passing through the first extension 40 of the anode exhaust recycle loop 38.

Additional components common to such a SOFC power plant 10 may also include a heat exchanger anode discharge line 72 that directs a portion or all of the anode exhaust stream leaving the second reformer heat exchanger 64 (or any anode exhaust stream supplied heat exchanger 44, 48) from the heat exchanger 64 to a mixer 74 secured to a cathode exhaust line 76 downstream from the cathode flow field 14. Within the cathode exhaust line 76, the unburned fuel within the anode exhaust stream from the anode discharge line 70 mixes with oxygen and is then directed through a first extension 78 of the cathode exhaust line 76 into a burner 80 that ignites and oxidizes all of the unused fuel within the anode exhaust stream. The burner 80 may be used in any manner known in the fuel cell art, such as to produce steam for the catalytic steam reformer 68, etc. A cathode exhaust three-way valve 82 is secured to the cathode exhaust line 76 downstream from the cathode flow field 14 and is controlled by a power plant control system (not shown) to deliver into the first extension 78 of the cathode exhaust line 76 a predetermined amount of oxygen necessary to produce complete oxidation of the unused fuel within the anode exhaust stream passing through the burner 80. A portion of the cathode exhaust may be directed through the three-way valve 82 through a burner bypass line 84 into a burner exhaust mixer 86. From the burner exhaust mixer 86 a second extension 88 of the cathode exhaust line 76 directs a flow of the exhaust from the burner 80 and any cathode exhaust from the bypass line 84 optionally into a cathode heat exchanger 90 secured in thermal exchange relation with the oxidant stream passing through the cathode inlet 18. A third extension 92 of the cathode exhaust line directs the combined cathode exhaust and burner exhaust out of the power plant 10 through a cathode exhaust vent 94 (labeled in FIGS. 1-6 as "OUT" for efficiency of viewing).

Figure 2:
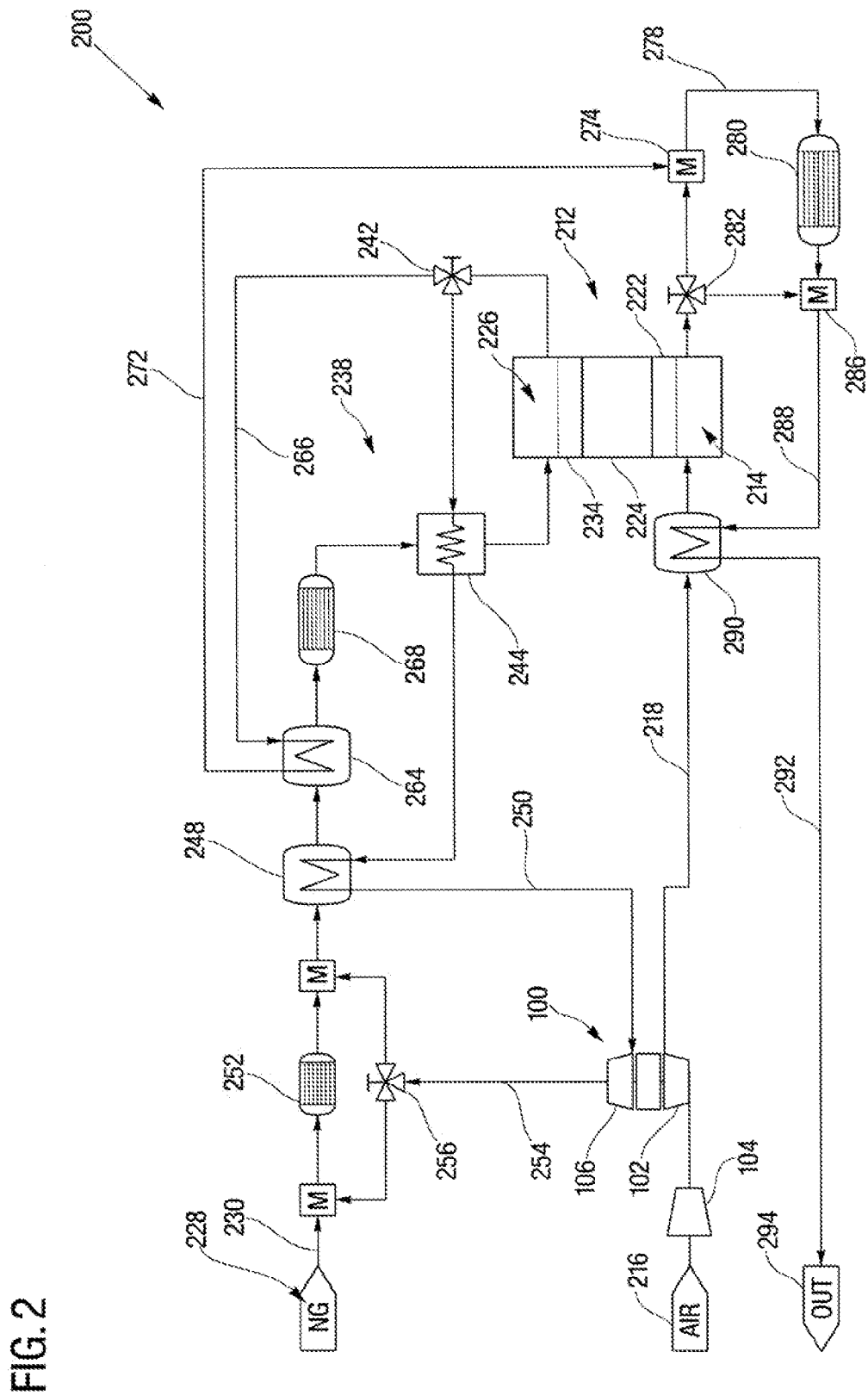
FIG. 2 is a simplified, schematic drawing showing a solid oxide fuel cell power plant with an anode recycle turbocharger constructed in accordance with the present disclosure.

For purposes of efficiency, the components of the prior art SOFC power plant 10 that are virtually identical to components of a FIG. 2 embodiment will be identified with two hundred added to the reference numerals of the FIG. 1 embodiment. For example, the solid oxide fuel cell 12 of FIG. 1 will be designated in FIG. 2 with the reference numeral 212. The same numbering system will apply FIGS. 3-6, wherein for example a solid oxide fuel cell in FIG. 3 will be designated by the reference numeral 312, in FIG. 4 as 412, etc. New components not shown in the prior art FIG. 1 embodiment will be represented by reference numerals from 100 to 199.

A first embodiment of the solid oxide fuel cell power plant with an anode exhaust recycle loop turbocharger 100 is shown in FIG. 2 and the power plant is generally designated by reference numeral 200. The anode exhaust recycle turbocharger 100 has a turbocharger turbine 102 secured in fluid communication with a compressed oxidant stream within an oxidant inlet line 218 downstream from an oxidant compressor 104 or compressed oxidant supply 104. The oxidant compressor 104 or compressed air supply 104 may be any compressor or compressed gas or air container known in the fuel cell and related arts capable of compressing a stream of oxidant such as atmospheric air to an appropriate pressure and flow rate to supply a predetermined oxidant demand of a solid oxide fuel cell 212, or a stack of such fuel cells 212. The anode exhaust recycle turbocharger 100 also includes a turbocharger compressor 106 mechanically linked to the turbocharger turbine 102 and secured in fluid communication with a flow of anode exhaust passing through an anode exhaust recycle loop 238. As shown in FIG. 2, the turbocharger compressor 106 may receive the anode exhaust stream from a third extension 250 of the recycle loop 238, and the compressor 106 compresses the anode exhaust stream by way of the spinning of the turbocharger turbine 102 being impacted by the compressed oxidant stream within the cathode inlet line 218. After compressing the anode exhaust stream, the turbocharger compressor 106 directs the compressed anode exhaust stream out of the compressor 106 and into a fourth extension 254 of the anode exhaust recycle loop 238. The compressed anode exhaust stream then is directed back into an anode inlet 230 to join incoming fuel reactant and to be directed by the anode inlet 230 back into an anode flow field 226 of the SOFC 212.

As summarized above, by using the anode recycle turbocharger 100 within the anode recycle loop 238, a turbocharger that is commonly utilized within automotive engines may be used. These automotive turbochargers are available in a diverse array of performance characteristics from the intensely competitive automotive racing industry. Also, it is known that such automotive turbochargers generally are constructed to tolerate very high temperatures, frequently exceeding 700° C.

It is noted that an efficient SOFC power plant 200 would have a design lifetime of well in excess of at least ten years. Additionally, such a high-temperature SOFC power plant 200 would normally operate at a near steady-state with very few start-stop cycles. In contrast, automotive turbochargers typically have a much shorter design lifetime, such as five-seven years. However, automotive turbochargers are designed to experience intense thermal cycling associated with several start-stop cycles each day. Therefore, the inventors herein have discovered that using such automotive turbochargers in the near steady-state environment of an operating SOFC power plant 200 enables the automotive turbochargers to easily match the design life of the SOFC power plant 200.

Figure 3:
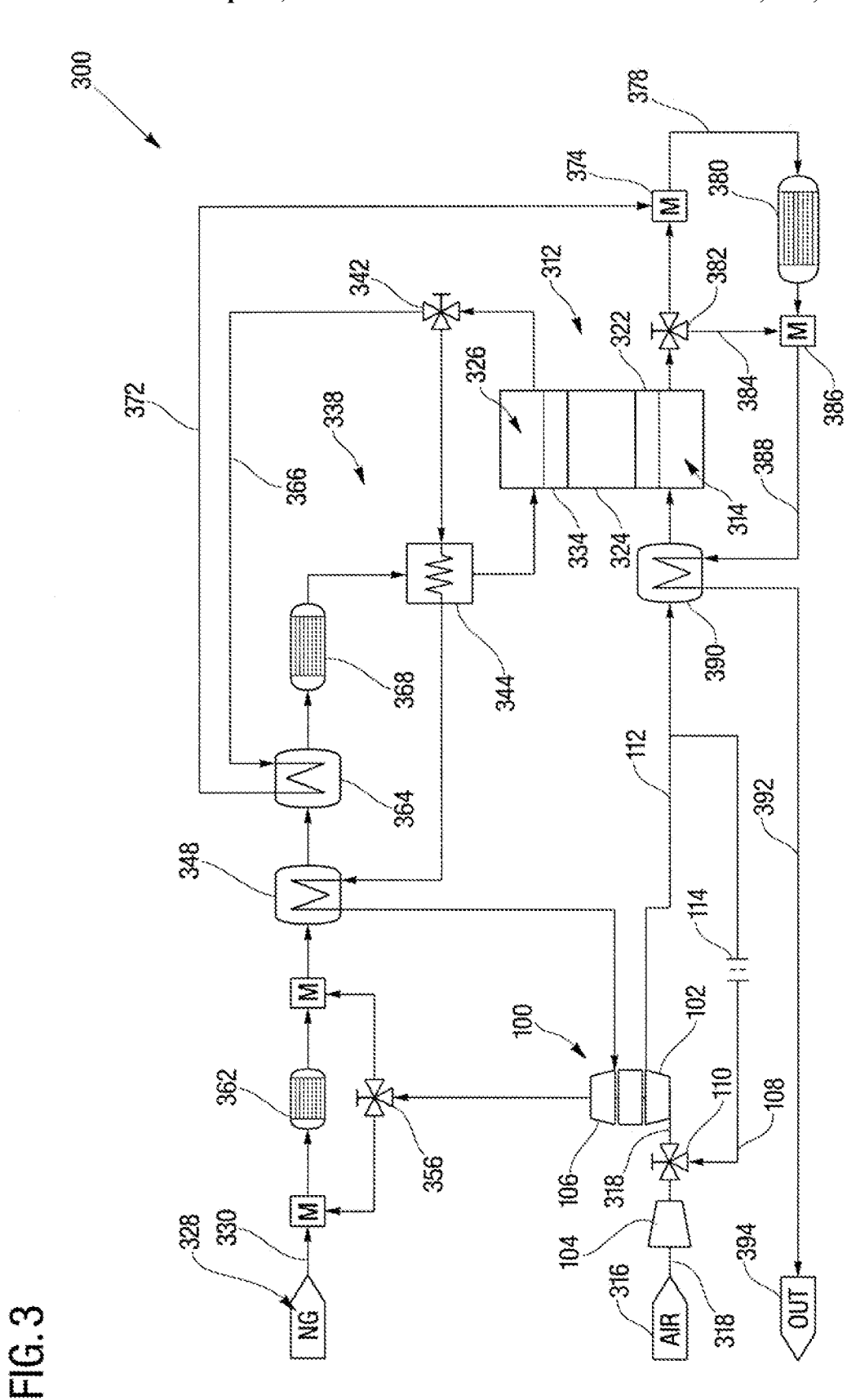
FIG. 3 is a simplified, schematic drawing showing a solid oxide fuel cell power plant with an anode recycle turbocharger constructed in accordance with the present disclosure and showing a turbocharger bypass line.

FIG. 3 shows another embodiment of the present SOFC power plant with an anode recycle turbocharger 100 and this embodiment of the plant is generally designated by the reference numeral 300. In this FIG. 3 embodiment 300, a cathode inlet line 318 may include a turbocharger bypass line 108 that extends from a bypass three-way valve 110 that is secured to the cathode inlet line 318 downstream from the compressor 104. The turbocharger bypass line 108 directs a portion or all of the compressed oxidant stream within the cathode inlet line 318 from the cathode inlet line 318 upstream of the turbocharger turbine 102 around the turbine 102 and back into a first extension 112 of the cathode inlet line 318 downstream from the turbocharger turbine 102. As shown in FIG. 3, the first extension 112 of the cathode inlet line simply extends from the turbocharger turbine 102 into the cathode flow field 314. The cathode bypass line 108 may also include an adjustable orifice 114 for selectively permitting a predetermined portion of atmospheric air into the bypass line in order to control the speed of the turbocharger turbine 102.

The turbocharger bypass line 108 enables a greater flow rate of oxidant reactant to flow into the cathode flow field than may be necessary to compress anode exhaust stream through the anode recycle loop 338. Additionally, based on variable operating conditions a power plant 300 control system (not shown) may control the bypass three-way valve 110 to selectively vary an amount of the oxidant stream passing into the turbocharger turbine 102. Such variable operating conditions may arise due to changes in ambient weather, requirements for increased or decreased power, start-stop cycles, etc.

It is to be understood that the phrase "power plant control system" refers to any control system or controller known in the fuel cell and related arts that is capable of performing the described functions. Such a control system may include static, non-variable configurations of fluid mixers and/or valves; hand operable valve handles to be set to variable positions by a power plant operator (not shown); electro-mechanically, pneumatically or hydraulically actuated valves and/or compressor settings that are actuated automatically in response to sensed information after such sensed information is processed through a microprocessor, such as a computer, etc.

Figure 4:
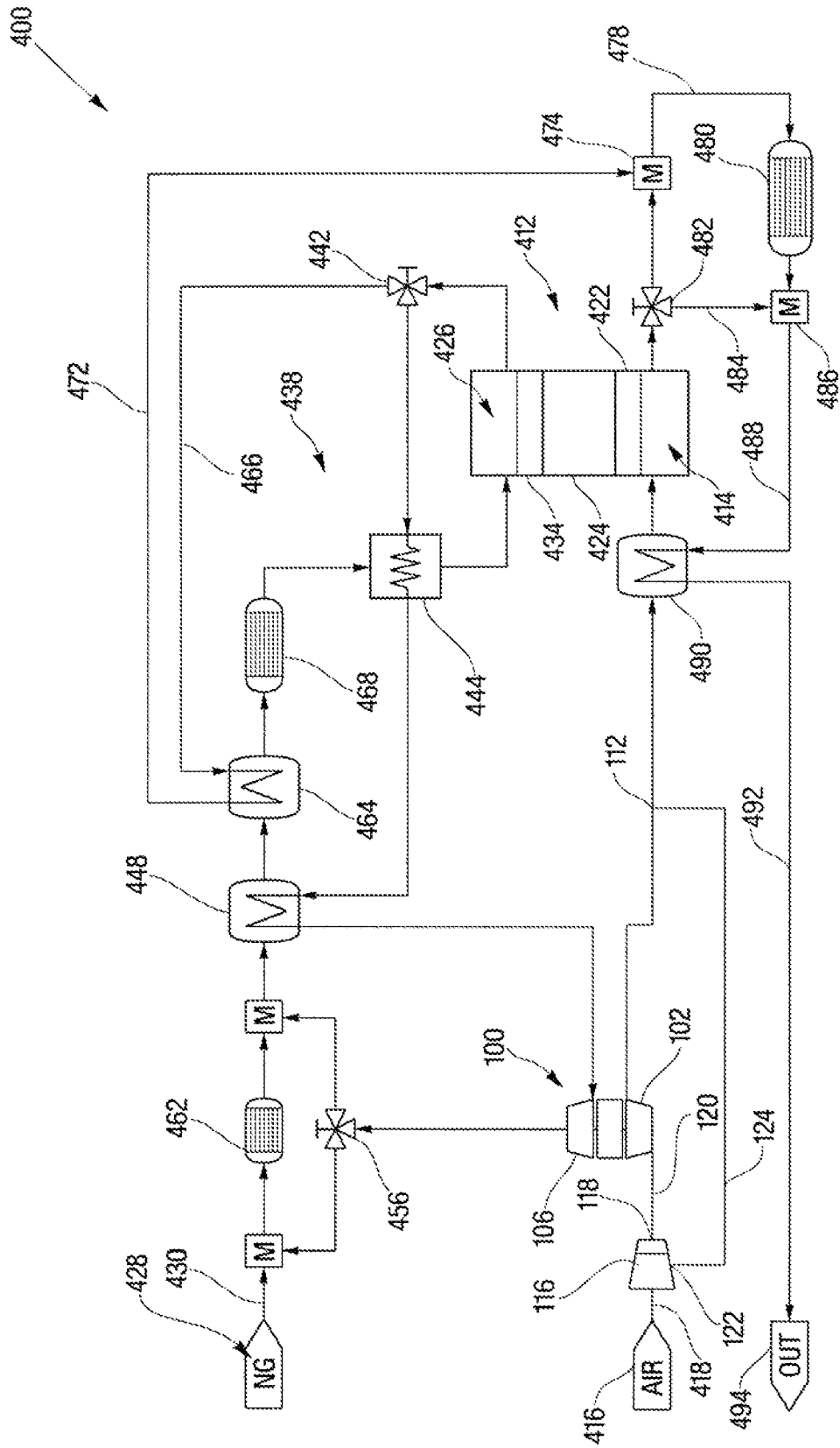
FIG. 4 is a simplified, schematic drawing showing a solid oxide fuel cell power plant with an anode recycle turbocharger constructed in accordance with the present disclosure and showing a multi-stage oxidant compressor and turbocharger bypass line.

FIG. 4 shows another embodiment of the present SOFC power plant with an anode recycle turbocharger 100 and this FIG. 4 embodiment of the plant is generally designated by the reference numeral 400. In this embodiment 400 a multi-stage oxidant compressor 116 is utilized on a cathode inlet line 418. A required pressure rise for the oxidant stream within the cathode inlet line 418 may be lower than a proper pressure to efficiently drive the turbocharger turbine 102. Use of the multi-stage oxidant compressor 116 will provide different pressures at different outlets of the multi-stage compressor 116. A high pressure outlet 118 directs flow of a portion of the oxidant reactant stream through a second extension 120 of the cathode inlet line 418 from the multi-stage oxidant compressor 116 into the turbocharger turbine 102. A low pressure outlet 122 directs flow of another portion of the oxidant reactant stream through a second turbocharger bypass line 124 extending from the compressor 116 into the first extension 112 of the cathode inlet line 418 downstream from the turbocharger turbine 102 as shown in FIG. 4.

Use of the multi-stage compressor 116 will minimize energy loss resulting from over pressurizing the cathode air to drive the turbocharger turbine 102. Any multi-stage compressor 116 may be utilized in the FIG. 4 embodiment of the SOFC power plant 400 that is known in the art and is capable of performing the above described functions.

Figure 5:
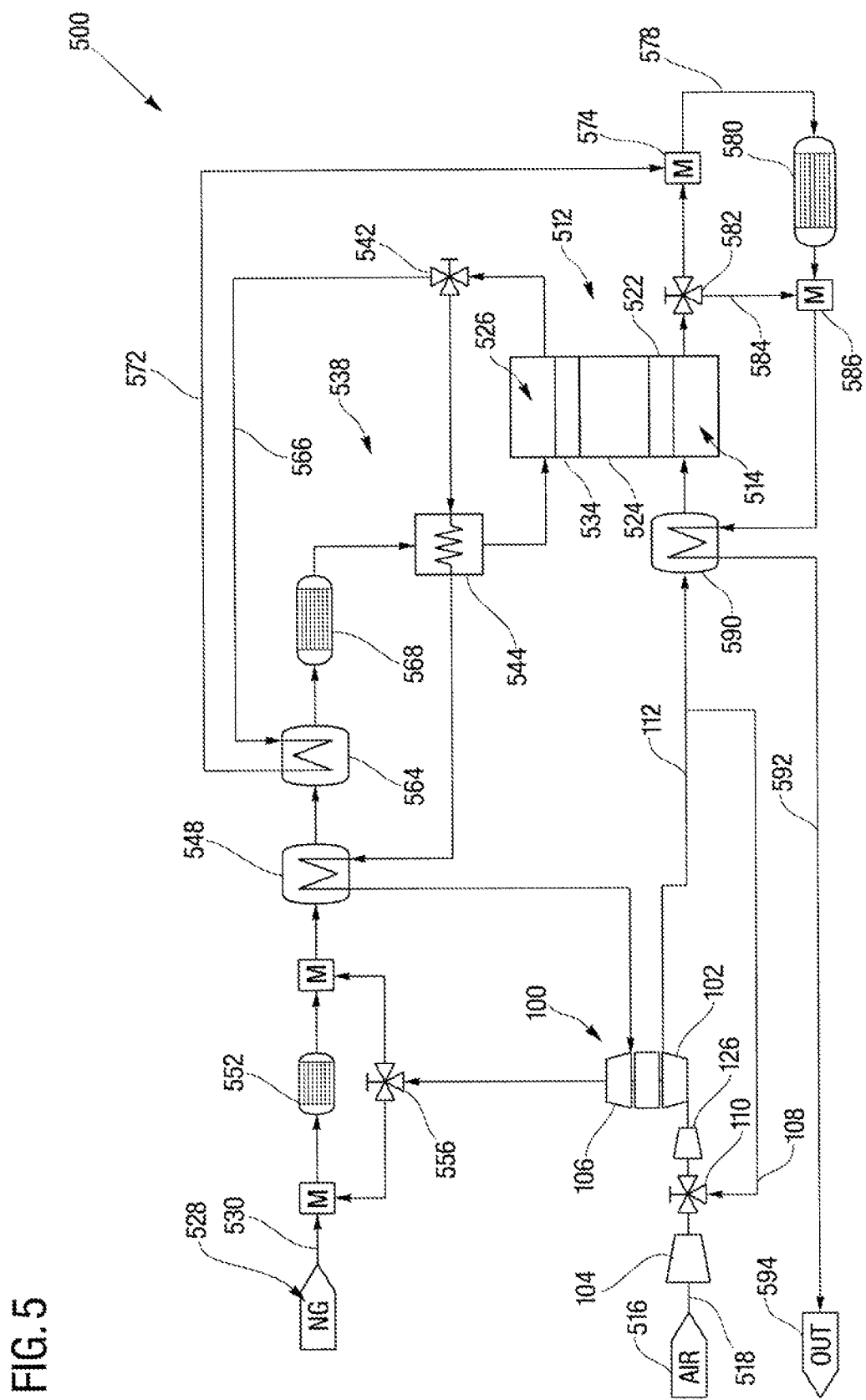
FIG. 5 is a simplified, schematic drawing showing a solid oxide fuel cell power plant with an anode recycle turbocharger constructed in accordance with the present disclosure and showing an oxidant inlet line pressure booster.

FIG. 5 shows another embodiment of the present SOFC power plant with an anode recycle turbocharger 100 and this FIG. 5 embodiment of the plant is generally designated by the reference numeral 500. The FIG. 5 embodiment of the SOFC power plant 500 also includes a pressure booster 126 that may be secured in fluid communication with the second extension 120 of the cathode inlet line 518 between the compressed oxidant supply 104 and the turbocharger turbine 102. The pressure booster 126 would be secured to the second extension 120 downstream from an intersection of the bypass three-way valve 110 of the oxidant inlet line 518 and the turbocharger bypass line 108, so that the compressed oxidant supply 104 provides the oxidant stream at a proper pressure and flow rate for the cathode flow field 514 of the fuel cell 512 through the turbocharger bypass line 108.

Simultaneously, the pressure booster 126 provides a proper pressure rise of the portion of the oxidant stream passing from the oxidant inlet line 518 through the bypass three-way valve 110, through the second extension 120 of the cathode inlet line 518 and into the turbocharger turbine 102. As shown in FIG. 5, the oxidant stream passes out of the turbocharger turbine 102 through the first extension 112 of the cathode inlet line 518 and into the cathode flow field 514 of the fuel cell 512. Use of the pressure booster 126 as described above would be an alternative to the possibly more expensive and more complicated multi-stage oxidant compressor 116 of the FIG. 4 embodiment.

The pressure booster 126 would provide the same flexibility of distribution of the oxidant stream between the turbocharger turbine 102 and the cathode flow field 514 as with the multi-stage oxidant compressor 116 of the FIG. 4 embodiment. Any pressure booster 126 known in the art and suitable for the above described usage may be utilized.

Figure 6:
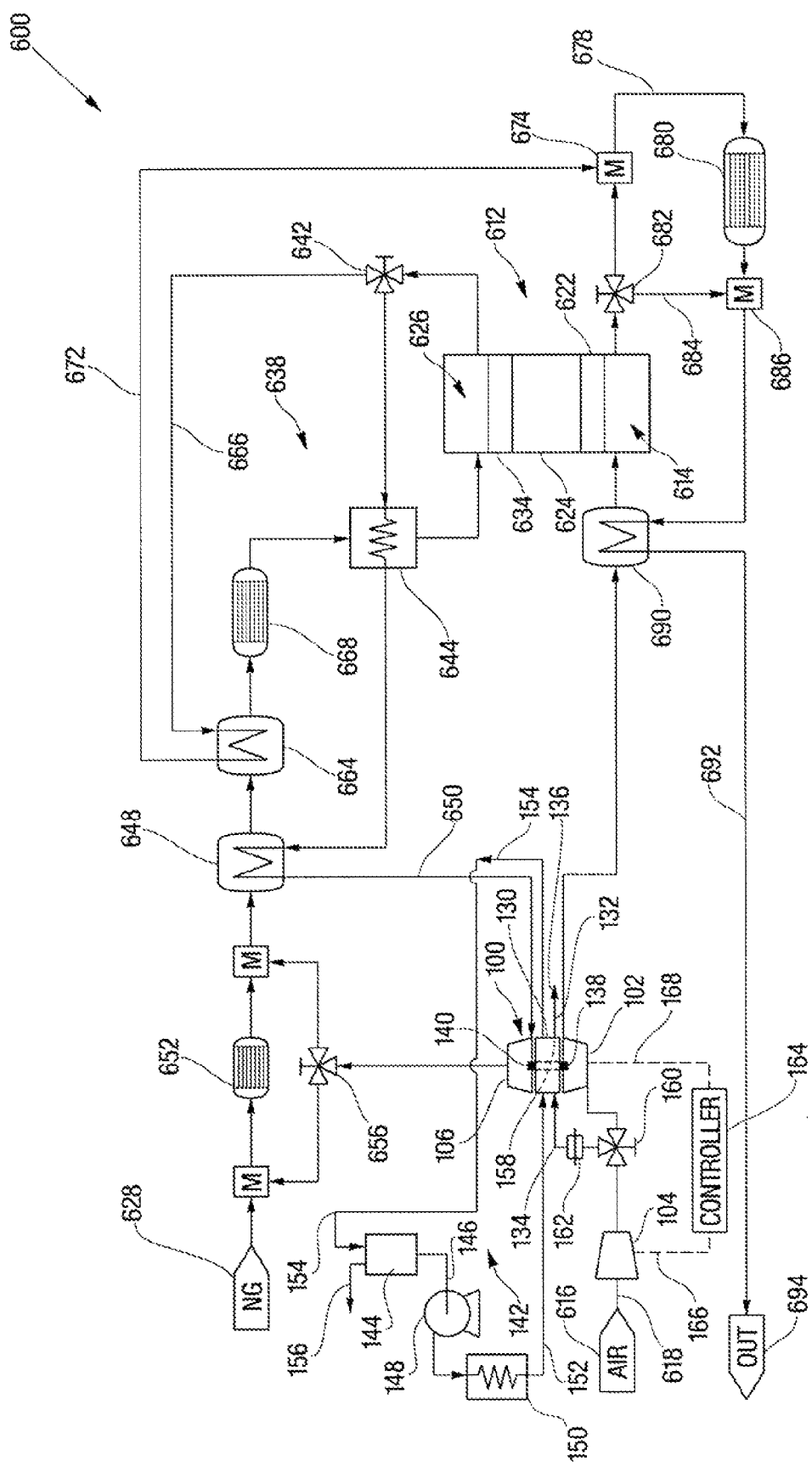
FIG. 6 is a simplified, schematic drawing showing an alternative solid oxide fuel cell power plant with a pressured regulated, gas purged anode recycle turbocharger constructed in accordance with the present disclosure.

FIG. 6 shows yet another embodiment of the present SOFC power plant with an anode recycle turbocharger 100 and this FIG. 6 embodiment of the plant is generally designated by the reference numeral 600. In the FIG. 6 embodiment of the power plant 600, the turbocharger 100 also includes a housing 130 enclosing mechanical linkage 132 between the turbocharger turbine 102 and the turbocharger compressor 106. A purge gas line 134 extends from the oxidant inlet line 618 into the housing 130, and the purge gas line preferably secured to the oxidant inlet line 618 downstream from the oxidant blower 104 as shown in FIG. 6.

The housing 130 is configured so that a pressure within the housing 130 is less than pressures of the reactant streams within the oxidant inlet line 618 and anode recycle loop 638 and in particular within a third extension line or pipe 650 of the anode recycle loop 638. Purge gas passing through the housing 130 removes out of the housing 130 through a housing vent 136 to safe disposal any oxidant reactant leaking through a compressor seal 138 of the turbocharger compressor 102 and any fuel reactant leaking through a turbine seal 140 into the housing 130.

The FIG. 6 embodiment may also include a lubricating oil loop 142 for lubricating the mechanical linkage 132 within the housing 130. The lubricating oil loop includes an oil accumulator 144 for storing lubricating oil; an oil feed line 146 that directs oil out of the accumulator 144, through an oil pump 148, through an oil heat exchanger 150, through a first extension 152 of the oil feed line 146, and into lubrication contact with the mechanical linkage 132 within the housing 130. (It is to be understood that the phrase "mechanical linkage 132" includes all necessary shafts, bearings, seals and any flexible joints ordinarily found in known mechanical components linking a turbocharger compressor 106 and turbocharger turbine 102.) The oil loop 142 also includes an oil return line 154 that directs the lubricating oil out of the housing 130 and back into the oil accumulator 144. The oil accumulator 144 may also include a vent 156 for directing out of the accumulator 144 any excess oil or accumulated, volatilized oil or related gaseous products.

The purge gas passing into the housing 130 through the purge gas line 136 also removes any volatilized lubricating oil out of the housing 130 so that such volatilized lubricating oil cannot contaminate reactant streams within the turbocharger turbine 102 and or the turbocharger compressor 106. This represents a major benefit over known technology. Prior art SOFC power plants using standard anode exhaust recycle stream blowers 52 exposed to the 400° C. exhaust stream present a grave risk of permitting volatilized lubrication to pass into the anode recycle loop 638 and to travel with the recycled anode exhaust stream into the anode flow field 626 wherein the oil and related lubrication compounds poison the fuel cell 612 anode electrode 634 and electrolyte 624. This dramatically diminishes fuel cell 612 performance and increases maintenance costs of the power plant 600 by requiring cleaning or replacement of the anode catalyst 634, the electrolyte 624 and the cathode catalyst 622.

The housing 130 is configured so that the mechanical linkage 132 between the turbocharger turbine 102 and the turbocharger compressor 106 passes within the housing 130. The mechanical linkage 132 also includes a lubricated bearing supported shaft 158 within the housing 130 and the shaft 158 passes from the housing 130 into the turbocharger turbine 102 through the turbocharger turbine seal 138. The shaft 158 also passes from the housing 130 into the turbocharger compressor 106 through the turbocharger compressor seal 140.

The purge gas line 134 is preferably secured in fluid communication between the oxidant inlet 618 downstream from the compressed oxidant supply 104 and the housing 130 of the turbocharger 100 for directing a purge gas stream from the oxidant inlet 618 into, through and out of the housing 130 through the housing vent 136. The purge gas line 134 is preferably secured through a purge line three-way valve 160 secured to the cathode inlet 618 for directing a portion of the oxidant stream from the inlet 618 into the purge gas line 134. The purge gas line 134 may also include a restriction orifice 162 for restricting flow of purge gas through the purge gas line 134. Only a small flow of purge gas is required to purge the housing 130.

The housing 130 of the turbocharger 100 is optionally configured so that a pressure within the housing 130 is about ambient pressure. The compressed oxidant supply 104 compresses the oxidant within the flow of oxidant flowing through the turbocharger turbine 102 to a pressure above ambient pressure. Also, the turbocharger compressor 106 causes a pressure within the flow of the anode exhaust stream flowing through the turbocharger compressor 106 to similarly be above ambient pressure.

The configuration of the housing 130 may simply be that the purge gas outlet or housing vent 136 of the housing 130 and the purge gas line 134 are proportionately dimensioned so that a rate of flow of the purge gas out of the housing 130 through the vent 136 is adequate to prevent any build-up of pressure beyond ambient within the housing 130. Alternatively, the power plant may include a controller 164 for controlling a pressure within the housing 130 to be below a pressure of the oxidant within the turbocharger turbine 102 and to be below a pressure of the anode exhaust within the turbocharger compressor 106. As described above, such a controller or control system 164 may include static proportionate dimensions of the housing vent 136 and purge gas line 134, hand-actuated, electro-mechanical, pneumatic, or hydraulic valves 160, pressure sensors (not shown) transferring sensed information through communication lines 166, 168 to and from a microprocessor or a computer controller 164 that is appropriate for adjusting valves, turbines and compressors in response to the sensed information.

By having the pressure within the housing 130 be less than the pressure in the turbocharger turbine 102 and the pressure in the turbocharger compressor 106, any leaks of the oxidant flow within the turbocharger turbine 102 through the turbocharger turbine seal 140 or any leaks of anode exhaust fuel flow within the turbocharger compressor 106 through the turbocharger compressor seal 140 would pass from the turbine 102 or compressor 106 into the lower pressure housing 130 to be purged out of the housing 130 through the housing vent 136 by the purge gas stream that enters the housing 130 from the purge gas line 134. Additionally, any volatilized lubricants from the bearing supported shaft 158 and any other contaminants from components of the mechanical linkage 132 between the turbocharger turbine 102 and compressor 106 within the housing 130 will also be forced out of the housing 130 through the housing vent 136 by the purge gas stream.

For purposes herein, the word "about" is to mean plus or minus ten percent.

While the above disclosure has been presented with respect to the described and illustrated embodiments of a solid oxide fuel cell power plant with an anode recycle turbocharger, it is to be understood that the disclosure is not to be limited to those alternatives and described embodiments. For example, it is to be understood the above descriptions and illustrations focus upon a single solid oxide fuel cell 12. However, in ordinary operating power plants of the present disclosure it is likely that the fuel cell 12 will be one of many fuel cells cooperatively secured in a fuel cell stack assembly configured to produce a predetermined amount of electrical power and heat. Accordingly, reference should be made primarily to the following claims rather than the foregoing description to determine the scope of the disclosure.

What is claimed is:

1. A solid oxide fuel cell power plant, comprising:
    a solid oxide fuel cell that includes:
        a cathode flow field configured to receive a flow of an oxidant reactant through a cathode inlet line from a compressed oxidant supply, and configured to direct the flow of the oxidant reactant through the cathode flow field in fluid communication with a cathode electrode and an electrolyte;
        an anode flow field configured to receive a flow of a reducing fuel through an anode inlet from a fuel supply, and configured to direct the flow of reducing fuel adjacent an anode electrode and the electrolyte, and configured to direct the flow of the reducing fuel out of the fuel cell as an anode exhaust through the anode exhaust line;
    an anode exhaust recycle loop configured to direct a flow of at least a portion of the anode exhaust passing out of the anode flow field within the anode exhaust line from the anode exhaust line and back into the anode inlet;
    a turbocharger including:
        a turbocharger turbine and a turbocharger compressor mechanically linked together, and including a housing between the turbocharger turbine and the turbocharger compressor, the mechanical linkage including a lubricated bearing supported shaft within the housing, the turbocharger turbine being secured in fluid communication with the flow of oxidant passing downstream from the compressed oxidant supply, and the turbocharger compressor being secured in fluid communication with the flow of anode exhaust passing through the anode exhaust recycle loop; and
    a purge gas line secured in fluid communication between the oxidant inlet downstream from the compressed oxidant supply and the housing of the turbocharger and configured to direct a purge gas stream from the oxidant inlet into, through and out of the housing.

2. The solid oxide fuel cell power plant of claim 1 wherein the housing of the turbocharger being configured to have a first pressure within the housing and a second pressure within the flow of oxidant flowing through the turbocharger turbine is greater than the first pressure and a third pressure within the flow of fuel flowing through the turbocharger compressor is greater than the first pressure.

3. The solid oxide fuel cell power plant of claim 2, further comprises a turbocharger bypass line extending from the cathode inlet line downstream from the compressed oxidant supply and upstream of the turbocharger turbine to pass around the turbine and back into a first extension of the cathode inlet line downstream from the turbocharger turbine, a portion of the compressed oxidant stream passes from the compressed oxidant supply through the turbocharger bypass line and into the cathode flow field bypassing the turbocharger turbine.

4. The solid oxide fuel cell power plant of claim 3, further comprising a bypass three-way valve that is secured to the cathode inlet line downstream from the compressed oxidant supply and to the turbocharger bypass line to selectively direct the portion of the compressed oxidant stream to pass into the turbocharger bypass line and into the cathode flow field bypassing the turbocharger turbine.

5. The solid oxide fuel cell power plant of claim 1, wherein the compressed oxidant supply includes a multi-stage oxidant compressor having a high pressure outlet to direct flow of a portion of the oxidant reactant stream through the cathode inlet line from the multi-stage oxidant compressor into the turbocharger turbine, and a low pressure outlet of the multi-stage compressor to direct flow of another portion of the oxidant reactant stream through a turbocharger bypass line extending from the compressor into a first extension of the cathode inlet line downstream from the turbocharger turbine.

6. The solid oxide fuel cell power plant of claim 4, further comprising a pressure booster secured in fluid communication with a second extension of the cathode inlet line secured between the compressed oxidant supply and the turbocharger turbine downstream from an intersection of the bypass three-way valve on the oxidant inlet line and the turbocharger bypass line, the pressure booster being configured to provide a pressure rise of the portion of the oxidant stream passing from the oxidant inlet line through the bypass three-way valve, through the second extension of the cathode inlet line and into the turbocharger turbine, and the compressed oxidant supply is configured to provide the oxidant stream at a pressure rise and flow rate for the cathode flow field of the fuel cell through the turbocharger bypass line.

7. The solid oxide fuel cell power plant of claim 2, wherein the first pressure is about ambient pressure.

8. The solid oxide fuel cell power plant of claim 1, wherein the lubricated bearing supported shaft within the housing is secured in fluid communication with a feed line and a return line of a lubricating oil loop.

9. The solid oxide fuel cell power plant of claim 1, wherein the housing is configured so that mechanical linkage between the turbocharger turbine and the turbocharger compressor passes within the housing.

10. The solid oxide fuel cell power plant of claim 1, wherein the shaft passes from the housing into the turbocharger turbine through a turbocharger turbine seal in the housing, the shaft passing from the housing into the turbocharger compressor through a turbocharger compressor seal in the housing.

11. A device, comprising:
a solid oxide fuel cell that includes:
an anode electrode;
a cathode electrode;
a compressed oxidant supply;
an anode flow field;
an anode inlet;
an anode exhaust recycle loop configured to direct at least a portion of a flow of anode exhaust from the anode flow field into the anode inlet;
a turbocharger that includes:
a turbocharger turbine that is secured in fluid communication with a flow of oxidant passing downstream from the compressed oxidant supply; and
a turbocharger compressor that is secured in fluid communication with the flow of anode exhaust passing through the anode exhaust recycle loop, the turbocharger turbine and the turbocharger compressor being mechanically linked together and including a housing between the turbocharger turbine and the turbocharger compressor, the mechanical linkage including a lubricated bearing supported shaft within the housing.

12. The device of claim 11, wherein the solid oxide fuel cell includes a cathode flow field and a cathode inlet line, the cathode flow field configured to receive a flow of an oxidant reactant through the cathode inlet line from the compressed oxidant supply.

13. The device of claim 12, wherein the cathode flow filed is configured to direct the flow of the oxidant reactant through the cathode flow field in fluid communication with the cathode electrode and an electrolyte.

14. The device of claim 11, wherein the solid oxide fuel cell includes and anode inlet and an anode exhaust line, and the anode flow field is configured to receive a flow of a reducing fuel through an anode inlet from a fuel supply, the anode flow field is configured to direct the flow of reducing fuel adjacent to the anode electrode and the electrolyte, and configured to direct the flow of the reducing fuel out of the fuel cell as an anode exhaust through the anode exhaust line.

15. The device of claim 11, wherein the mechanical linkage between the turbocharger turbine and the turbocharger compressor passes within the housing.

16. The device of claim 15, wherein the shaft passes from the housing into the turbocharger turbine through a turbocharger turbine seal in the housing.

17. The device of claim 16, wherein the shaft passing from the housing into the turbocharger compressor through a turbocharger compressor seal in the housing.

18. The device of claim 11, further comprising a purge gas line secured in fluid communication between the oxidant inlet downstream from the compressed oxidant supply and the housing of the turbocharger to direct a purge gas stream from the oxidant inlet into, through and out of the housing.

* * * * *